Patented Oct. 13, 1925.

1,557,384

UNITED STATES PATENT OFFICE.

WELLINGTON LEE TANNER, OF CLEVELAND, OHIO, ASSIGNOR TO THE GRASSELLI CHEMICAL COMPANY, OF CLEVELAND, OHIO, A CORPORATION OF OHIO.

METHOD FOR THE MANUFACTURE OF DIPHENYLAMINE CHLORARSINE.

No Drawing.  Application filed August 17, 1922. Serial No. 582,531.

*To all whom it may concern:*

Be it known that I, WELLINGTON LEE TANNER, a citizen of the United States, residing at Cleveland, in the county of Cuyahoga and State of Ohio, have invented certain new and useful Improvements in Methods for the Manufacture of Diphenylamine Chlorarsine, of which the following is a specification.

This invention relates to an improved process particularly designed for the manufacture of diphenylamine chlorarsine.

The process consists generally in causing arsenic trioxide, $As_2O_3$, to react with diphenylamine in the presence of dry hydrogen chloride, hydrochloric acid, or with the combination of diphenylamine and hydrochloric acid, that is, diphenylamine hydrochloride.

The process is particularly characterized by the fact that the arsenic is supplied to the reaction in the form of the oxid and further by the fact that the process may be and in practice is carried out at normal atmospheric pressure.

Further objects and advantages of the invention will appear hereinafter.

The process may be carried out in several ways, the choice of procedure depending somewhat upon the type of apparatus which it is desired to use.

*Example 1.*—A mixture of one molecular proportion of diphenylamine with one molecular proportion of arsenic trioxide is fused in a suitable receptacle, such as an iron pan, provided with a closure and dry hydrochloric acid is slowly led into the fused mass in quantity sufficient to supply one molecular proportion of hydrochloric acid. The mass is then heated to about 200° C. or higher to complete the reaction and expel the water formed. The dry reaction product consisting essentially of diphenylamine chlorarsine is purified by the usual methods, for instance by crystallization from acetone.

*Example 2.*—The vapors of diphenylamine hydrochloride and arsenic trioxide are united in equimolecular proportion in a heated retort and the resulting sublimate, consisting essentially of diphenylamine chlorarsine is collected and purified by the usual methods.

Both of the procedures illustraed in Examples 1 and 2 result in very good yields and a product of a high grade of purity.

On account of the convenience of handling the materials and the simplicity of the apparatus required the method illustrated in the following example is preferred:

*Example 3.*—An equimolecular mixture of diphenylamine hydrochloride and arsenic trioxide is heated to reacting temperature in a suitable retort and the reaction product purified in the usual manner. The procedure is as follows:

40 parts by weight of diphenylamine hydrochloride and 19.3 parts by weight of arsenic trioxide are mixed together in an iron pan provided with a vent pipe for water and gas formed by the reaction. Heat is applied to the retort and the mass which soon melts is stirred and the temperature gradually raised to about 210° C., the increase in temperature from about 55° C. to about 210° C. requiring about 2 hours.

The completion of the reaction is indicated when no more water is evolved. The reaction mass is then allowed to cool and is removed from the pan. This crude product coming directly from the reaction vessel is very pure and has a melting point of about 190° C. By crystallization from solution in acetone a product melting at 192.5° C. is obtained, the yield of this pure product calculated upon the theoretical yield being about 99.26 per cent.

The reaction involved in the process when diphenylamine and hydrochloric acid gas are used is represented by the following equation:

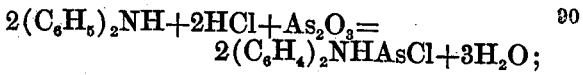

and when diphenylamine hydrochloride is used the reaction is represented by the following equation:

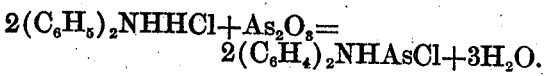

It will be apparent that the process of my invention is simple and easy to carry out and that the apparatus required is inexpensive. As has been pointed out the yield and purity of product are excellent, the yield being nearly quantitative. The process is particularly suited to factory operation on a large scale because it does not involve any pressure treatment or the use of any highly poisonous gas both of which are dangerous.

While the invention has been described with particular reference to the production of diphenylamine chlorarsine it is to be understood that the invention is not limited to the manufacture of this particular compound but is applicable for the preparation of other halogen arsines of other diarylamines.

I claim:

1. Process for the manufacture of diarylamine halogen arsines which comprises reacting upon arsenic trioxide with a diarylamine and a halogen hydride.

2. Process for the manufacture of diarylamine halogen arsines which comprises reacting upon arsenic trioxide with a diarylamine halogen hydride.

3. Process for the preparation of diarylamine chlorarsines which comprises heating a mixture of arsenic trioxide and a diarylamine hydrochloride.

4. Process for the manufacture of diphenylamine chlorarsine which comprises reacting upon arsenic trioxide with diphenylamine and hydrochloric acid.

5. Process for the manufacture of diphenylamine chlorarsine which comprises heating a mixture of arsenic trioxide and diphenylamine hydrochloride.

In testimony whereof, I affix my signature.

WELLINGTON LEE TANNER.